(12) United States Patent
Tanaka et al.

(10) Patent No.: US 10,202,139 B2
(45) Date of Patent: Feb. 12, 2019

(54) STEERING SYSTEM

(71) Applicant: JTEKT CORPORATION, Osaka-shi, Osaka (JP)

(72) Inventors: Hidenobu Tanaka, Shiki-gun (JP); Yoshihito Yoshihara, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 45 days.

(21) Appl. No.: 15/435,621

(22) Filed: Feb. 17, 2017

(65) Prior Publication Data

US 2017/0253262 A1 Sep. 7, 2017

(30) Foreign Application Priority Data

Mar. 2, 2016 (JP) ................................. 2016-040155

(51) Int. Cl.
| | |
|---|---|
| *B62D 1/184* | (2006.01) |
| *B62D 1/185* | (2006.01) |
| *B62D 1/187* | (2006.01) |

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS

| | | | | |
|---|---|---|---|---|
| 6,659,504 B2 * | 12/2003 | Riefe | ..................... | B62D 1/184 280/775 |
| 7,752,940 B2 * | 7/2010 | Lutz | ..................... | B62D 1/184 280/775 |

(Continued)

FOREIGN PATENT DOCUMENTS

| | | |
|---|---|---|
| DE | 102010044753 A1 | 3/2012 |
| EP | 3 023 317 A1 | 5/2016 |

(Continued)

OTHER PUBLICATIONS

Nov. 7, 2017 Search Report issued in European Patent Application No. 17157237.3.

*Primary Examiner* — Faye M Fleming
(74) *Attorney, Agent, or Firm* — Oliff PLC

(57) ABSTRACT

A steering system includes a movable member and a tooth member. The movable member includes first tooth arrangements. The movable member is movable together with a column jacket in a tilt direction. The movable member is movable in a right-left direction. The tooth member is supported by a lateral plate of an upper bracket so that the tooth member is located between the movable member and the lateral plate in the right-left direction. The tooth member includes: second tooth arrangements engageable with the first tooth arrangements; and curved elastic portions supporting the second tooth arrangements, with the second tooth arrangements inclined toward the upper bracket such that the second tooth arrangements are away from the first tooth arrangements. When the elastic portions are sandwiched between the movable member and the lateral plate and elastically deformed, the second tooth arrangements come into engagement with the first tooth arrangements.

8 Claims, 9 Drawing Sheets

(56) References Cited

U.S. PATENT DOCUMENTS

| | | | | |
|---|---|---|---|---|
| 8,006,587 | B2* | 8/2011 | Schnitzer | B62D 1/184 |
| | | | | 74/493 |
| 8,505,408 | B2* | 8/2013 | Havlicek | B62D 1/195 |
| | | | | 280/775 |
| 8,881,618 | B2* | 11/2014 | Buzzard | B62D 1/184 |
| | | | | 280/775 |
| 9,156,491 | B2* | 10/2015 | Okano | B62D 1/187 |
| 9,446,781 | B2* | 9/2016 | Tanaka | B62D 1/187 |
| 9,469,330 | B2* | 10/2016 | Tanaka | B62D 1/184 |
| 9,580,100 | B2* | 2/2017 | Tomiyama | B62D 1/184 |
| 9,604,663 | B2* | 3/2017 | Tomiyama | B62D 1/184 |
| 9,718,490 | B2* | 8/2017 | Tanaka | B62D 1/184 |
| 9,840,269 | B2* | 12/2017 | Tanaka | B62D 1/189 |
| 9,840,270 | B2* | 12/2017 | Tomiyama | B62D 1/184 |
| 2004/0261565 | A1* | 12/2004 | Uphaus | B62D 1/184 |
| | | | | 74/493 |
| 2009/0013817 | A1* | 1/2009 | Schnitzer | B62D 1/184 |
| | | | | 74/493 |
| 2012/0144953 | A1 | 6/2012 | Schnitzer | |
| 2017/0008546 | A1* | 1/2017 | Tanaka | B62D 1/189 |
| 2017/0313345 | A1* | 11/2017 | Tanaka | B62D 1/184 |

FOREIGN PATENT DOCUMENTS

| | | |
|---|---|---|
| WO | 2008/086548 A1 | 7/2008 |
| WO | 2011/020538 A1 | 2/2011 |
| WO | 2016/012788 A1 | 1/2016 |

* cited by examiner

STEERING SYSTEM

INCORPORATION BY REFERENCE

The disclosure of Japanese Patent Application No. 2016-040155 filed on Mar. 2, 2016 including the specification, drawings and abstract is incorporated herein by reference in its entirety.

BACKGROUND OF THE INVENTION

1. Field of the Invention

The invention relates to steering systems.

2. Description of the Related Art

Steering systems that have recently been developed include one provided with a tilt adjusting mechanism to adjust the position of a steering column in a tilt direction. US 2009/0013817 A1, for example, discloses a steering column including an adjuster movable in a tilt direction, and a holder whose position in the tilt direction is fixed. The adjuster and holder function as a tilt adjusting mechanism. The holder is provided with teeth aligned in the tilt direction. A clamp bolt of the adjuster is inserted through a tooth plate movable together with the clamp bolt in the tilt direction. The outer portions of the tooth plate in the tilt direction are each provided with an elastic arm that abuts against the holder.

An operating member is attached to the clamp bolt. Moving the operating member in a first direction presses the tooth plate so as to move the tooth plate to the holder, resulting in engagement of the teeth of the tooth plate with the teeth of the holder. This engagement fixes the position of the steering column in the tilt direction. In this case, the elastic arms are elastically deformed. Moving the operating member in a second direction opposite to the first direction releases the pressing of the tooth plate against the holder, resulting in elastic restoration of the elastic arms to their original shapes. This moves the tooth plate away from the holder. Thus, the teeth of the tooth plate are disengaged from the teeth of the holder.

The elastic arms of the steering column disclosed in US 2009/0013817 A1 are provided on the outer portions of the tooth plate in the tilt direction. This may unfortunately result in an increase in the size of the tooth plate. A conceivable solution to this disadvantage is to provide a steering column including elastic member(s) separate from a tooth plate and configured to move the tooth plate away from a holder. Such an arrangement, however, may increase the number of components.

SUMMARY OF THE INVENTION

An object of the invention is to provide a steering system configured to fix the position of a column jacket in a tilt direction by engagement of the teeth of a movable member or a bracket with the teeth of a small-size tooth member with a smaller number of components.

An aspect of the invention provides a steering system including a steering shaft, a column jacket, a bracket, a movable member, and a tooth member. The steering shaft is coupled at its one end to a steering member. The column jacket holds the steering shaft. The bracket supports the column jacket such that the column jacket is rotatable in a tilt direction. The bracket is secured to a vehicle body. The movable member includes a first tooth arrangement. The movable member is movable together with the column jacket in the tilt direction and movable in an intersecting direction intersecting the tilt direction and an axial direction of the steering shaft. The tooth member is supported by the bracket so that the tooth member is located between the movable member and the bracket in the intersecting direction. The tooth member includes a second tooth arrangement and a curved elastic portion. The second tooth arrangement is engageable with the first tooth arrangement. The elastic portion supports the second tooth arrangement, with the second tooth arrangement inclined toward the bracket such that the second tooth arrangement is away from the first tooth arrangement. The tooth member is configured so that the second tooth arrangement is in engagement with the first tooth arrangement, with the elastic portion being sandwiched between the movable member and the bracket and elastically deformed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
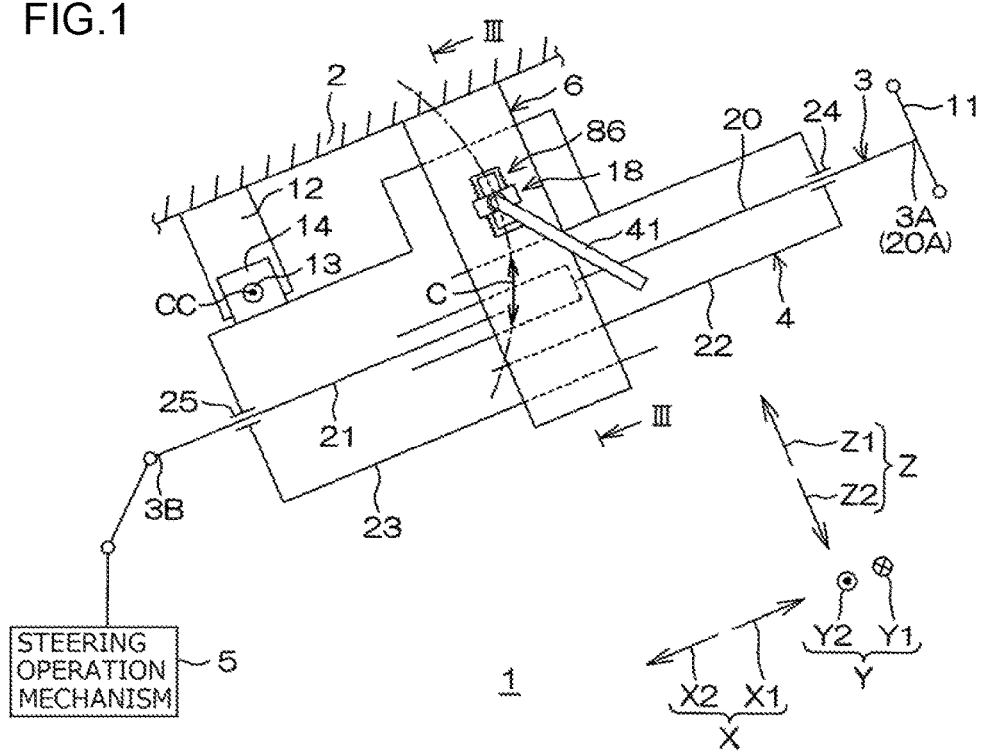
FIG. 1 is a side view of a steering system according to a first embodiment of the invention, illustrating a schematic configuration of the steering system.

Embodiments of the invention will be described in detail below with reference to the accompanying drawings. FIG. 1 is a side view of a steering system 1 according to a first embodiment of the invention, illustrating a schematic configuration of the steering system 1. The left side of FIG. 1 corresponds to the front portion of a vehicle body 2 to which the steering system 1 is attached. The right side of FIG. 1 corresponds to the rear portion of the vehicle body 2. The upper side of FIG. 1 corresponds to the upper portion of the vehicle body 2. The lower side of FIG. 1 corresponds to the lower portion of the vehicle body 2.

Referring to FIG. 1, the steering system 1 includes a steering shaft 3, a column jacket 4, and a steering operation mechanism 5. The steering shaft 3 includes: a first end 3A that is the rear end of the steering shaft 3; and a second end 3B that is the front end of the steering shaft 3. The first end 3A of the steering shaft 3 is coupled to a steering member 11. In response to a steering operation performed on the steering member 11, the steering system 1 steers not-illustrated steered wheel(s). The steering operation mechanism 5 is, for example, a rack-and-pinion mechanism but may be any other mechanism.

The steering shaft 3 extends in the front-rear direction of the vehicle body 2. The direction of extension of the steering shaft 3 will hereinafter be referred to as an "axial direction X". The axial direction X is inclined relative to the horizontal direction such that the second end 3B is lower than the first end 3A. The axial direction X includes a rearward direction X1 and a forward direction X2. The reference sign X1 may also represent the rear side in the axial direction X, and the reference sign X2 may also represent the front side in the axial direction X. A direction perpendicularly intersecting the axial direction X and perpendicular to the plane of FIG. 1 will be referred to as a "right-left direction Y" or an "intersecting direction". A direction extending substantially up and down in FIG. 1 will be referred to as an "up-down direction Z". The right-left direction Y includes a rightward direction Y1 that is a direction away from the viewer of FIG. 1, and a leftward direction Y2 that is a direction toward the viewer of FIG. 1. The reference sign Y1 may also represent the right side in the right-left direction Y, and the reference sign Y2 may also represent the left side in the right-left direction Y. The up-down direction Z includes an upward direction Z1 and a downward direction Z2. The reference sign Z1 may also represent the upper side in the up-down direction Z, and the reference sign Z2 may also represent the lower side in the up-down direction Z.

The definitions of the axial direction X, the rearward direction (rear side) X1, the forward direction (front side) X2, the right-left direction Y, the rightward direction (right side) Y1, the leftward direction (left side) Y2, the up-down direction Z, the upward direction (upper side) Z1, and the downward direction (lower side) Z2 in FIG. 1 also apply to FIGS. 2 to 10. The steering shaft 3 includes a tubular upper shaft 20 and a tubular lower shaft 21. The upper shaft 20 and the lower shaft 21 are fitted to each other by, for example, spline fitting or serration fitting so that the upper shaft 20 and the lower shaft 21 are movable relative to each other. The steering member 11 is coupled to an end 20A of the upper shaft 20. The end 20A is the rear end of the upper shaft 20.

The column jacket 4 includes an upper jacket 22 and a lower jacket 23. The lower jacket 23 is an outer jacket. The upper jacket 22 is an inner jacket fitted into the lower jacket 23. The axial direction X corresponds to the axial direction of the upper jacket 22 and the axial direction of the lower jacket 23. The steering shaft 3 is inserted through the column jacket 4. The upper shaft 20 is rotatably supported by the upper jacket 22 via a bearing 24. The lower shaft 21 is rotatably supported by the lower jacket 23 via a bearing 25. Thus, the column jacket 4 supports and holds the steering shaft 3 such that the steering shaft 3 is rotatable. The upper shaft 20 slides relative to the lower shaft 21 in the axial direction X. This means that the steering shaft 3 is extendable and retractable. Accordingly, the column jacket 4 is also extendable and retractable.

Extending and/or retracting the steering shaft 3 and the column jacket 4 in the axial direction X enables adjustment of the position of the steering member 11 in the front-rear direction of a vehicle. Thus, the steering system 1 has a telescopic adjusting function. The steering system 1 includes a lower bracket 12, a tilt central shaft 13, and a column bracket 14. The lower bracket 12 is secured to the vehicle body 2. The tilt central shaft 13 is supported by the lower bracket 12. The column bracket 14 is secured to the outer periphery of the lower jacket 23. The column bracket 14 is rotatably supported by the tilt central shaft 13. The steering shaft 3 and the column jacket 4 are rotatable (or tiltable) substantially upward and downward around a tilt center CC that is the central axis of the tilt central shaft 13. The direction of rotation around the tilt center CC will be referred to as a "tilt direction C". The tilt direction C intersects the right-left direction Y.

Figure 2:
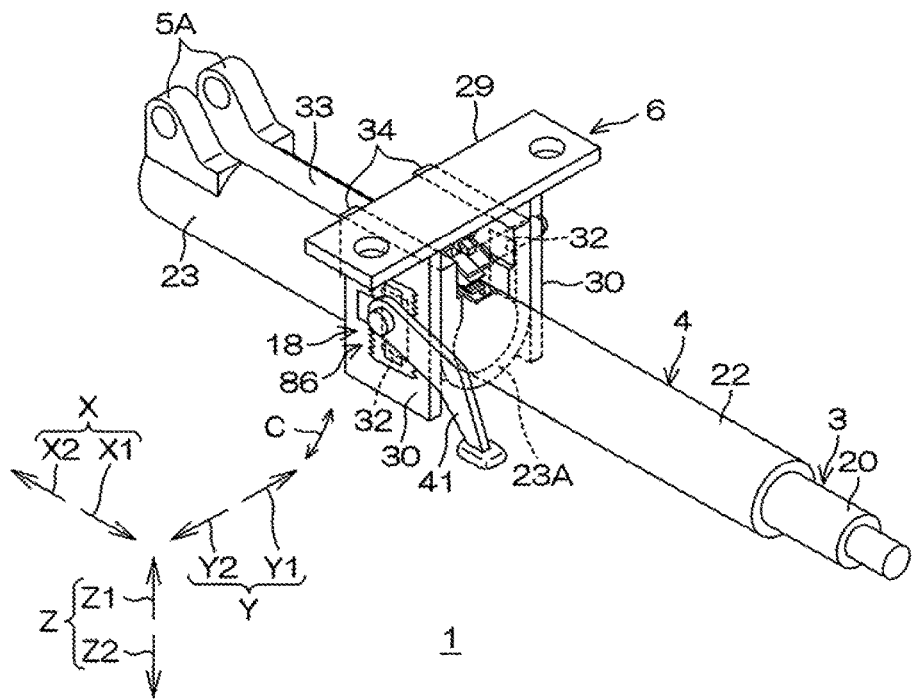
FIG. 2 is a perspective view of the steering system.

Rotating the steering shaft 3 and the column jacket 4 around the tilt center CC makes it possible to move the position of the steering member 11 substantially upward and/or downward. Thus, the steering system 1 has a tilt adjusting function. FIG. 2 is a perspective view of the steering system 1. Referring to FIG. 2, the steering system 1 includes an upper bracket 6 and a clamping mechanism 18. The upper bracket 6 supports the column jacket 4 such that the column jacket 4 is rotatable in the tilt direction C. The upper bracket 6 is secured to the vehicle body 2. The clamping mechanism 18 locks the position of the steering member 11 after the steering member 11 has undergone tilt adjustment and telescopic adjustment.

Figure 3:
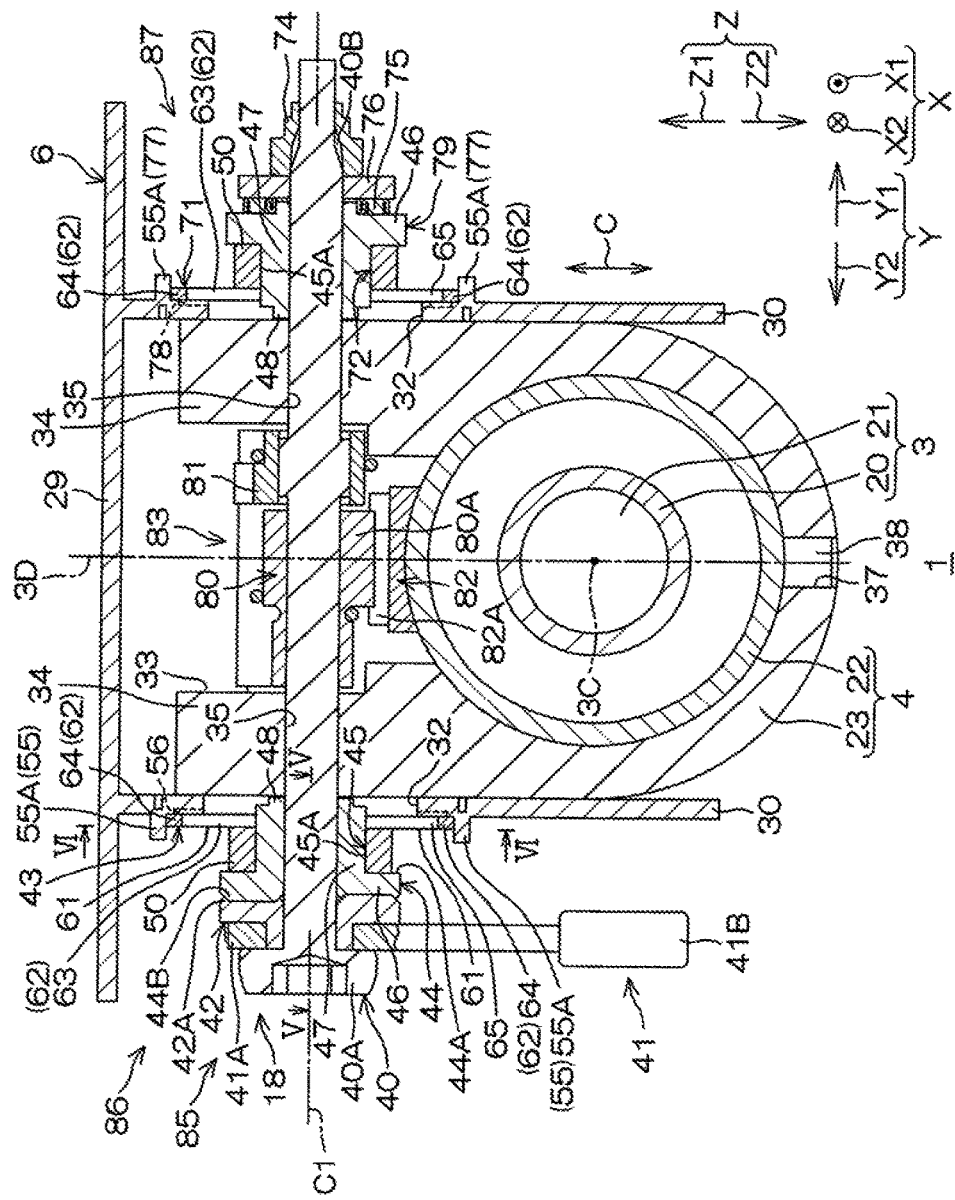
FIG. 3 is a schematic cross-sectional view of the steering system taken along the line III-III in FIG. 1.

The upper bracket 6 includes an attachment plate 29 and a pair of lateral plates 30. The attachment plate 29 is attached to the vehicle body 2. The pair of lateral plates 30 extend in the downward direction Z2 from the ends of the attachment plate 29. Each lateral plate 30 is provided with a rectangular insertion hole 32 elongated in the up-down direction Z. FIG. 3 is a schematic cross-sectional view of the steering system 1 taken along the line III-III in FIG. 1. In FIG. 3, the plane extending in the up-down direction Z and passing through a central axis 3C of the steering shaft 3 is defined as a reference plane 3D.

As illustrated in FIG. 3, the lower jacket 23 includes a slit 33 and a pair of clamped portions 34. The slit 33 extends in the forward direction X2 from the rear end of the lower jacket 23 in the axial direction X. The pair of clamped portions 34 are disposed on the opposite sides of the slit 33. Clamping the pair of clamped portions 34 enables the lower jacket 23 to be elastically reduced in diameter. The pair of clamped portions 34 are disposed between the pair of lateral plates 30. Each clamped portion 34 has a plate shape conforming to the inner lateral surface of an associated one of the lateral plates 30. Each of the pair of clamped portions 34 is provided with a shaft insertion hole 35. Each shaft insertion hole 35 is a circular hole.

A portion of the lower jacket 23 on the lower side Z2 is provided with a guide groove 37 extending in the axial direction X. A guided protrusion 38 secured to the upper jacket 22 is inserted into the guide groove 37. The guide groove 37 restricts rotation of the upper jacket 22 relative to the lower jacket 23 while guiding movement of the upper jacket 22 in the axial direction X via the guided protrusion 38. Abutment of an end of the guide groove 37 in the axial direction X against the guided protrusion 38 prevents disconnection of the upper jacket 22 from the lower jacket 23.

The clamping mechanism 18 includes an inserted shaft 40, an operating member 41, a cam 42, a clamping member 44, a movable member 45, and a tooth member 43. The operating member 41 is disposed in the vicinity of the lateral plate 30 on the left side Y2. The clamping mechanism 18 further includes a tooth member 71, a movable member 72, a clamping member 79, a nut 74, a needle roller bearing 75, and a thrust washer 76. The tooth member 71 is disposed in the vicinity of the lateral plate 30 on the right side Y1. The inserted shaft 40 is a bolt having a central axis C1 extending in the right-left direction Y. The inserted shaft 40 is inserted through portions of the steering system 1 where the shaft insertion holes 35 overlap with the insertion holes 32 as viewed in the right-left direction Y. Specifically, the shaft insertion holes 35 restrict movement of the inserted shaft 40 relative to the column jacket 4 in the axial direction X and the tilt direction C. With rotation of the column jacket 4, the inserted shaft 40 is movable in the tilt direction C. The left end of the inserted shaft 40 is provided with a head 40A. The right end of the inserted shaft 40 is provided with a thread groove 40B.

The operating member 41, the cam 42, the clamping member 44, the movable member 45, and the tooth member 43 are disposed between the head 40A of the inserted shaft 40 and the lateral plate 30 on the left side Y2. The nut 74 is attached to the thread groove 40B of the inserted shaft 40. The thrust washer 76 having an annular shape, the needle roller bearing 75 having an annular shape, the clamping member 79, the movable member 72, and the tooth member 71 are disposed between the nut 74 and the lateral plate 30 on the right side Y1. The needle roller bearing 75 and the thrust washer 76 are disposed between the clamping member 79 and the nut 74 in this order from the left side Y2. The inserted shaft 40 is inserted through the needle roller bearing 75 and the thrust washer 76.

Unless otherwise specified below, the tooth member 71, the movable member 72, and the clamping member 79 on the right side Y1 and the tooth member 43, the movable member 45, and the clamping member 44 on the left side Y2 are symmetrical with respect to the reference plane 3D. Thus, components of the tooth member 71, the movable member 72, and the clamping member 79 on the right side Y1 are identified by the same reference signs as those used to represent components of the tooth member 43, the movable member 45, and the clamping member 44 on the left side Y2, and description thereof will be omitted.

The operating member 41 is a graspable lever, for example. The operating member 41 includes: a base end 41A that is a first end of the operating member 41 in the longitudinal direction thereof; and a grip 41B that is a second end of the operating member 41 in the longitudinal direction thereof. The head 40A of the inserted shaft 40 is secured to the base end 41A such that the head 40A is rotatable together with the operating member 41. The cam 42 is coupled to the base end 41A of the operating member 41 such that the cam 42 is rotatable together with the base end 41A, and movement of the cam 42 relative to the inserted shaft 40 in the right-left direction Y is restricted. The central axis C1 of the inserted shaft 40 corresponds to the center of rotation of the operating member 41. A driver grasps the grip 41B of the operating member 41 and operates the operating member 41, so that the inserted shaft 40 and the cam 42 are rotated together with the operating member 41.

Figure 4:
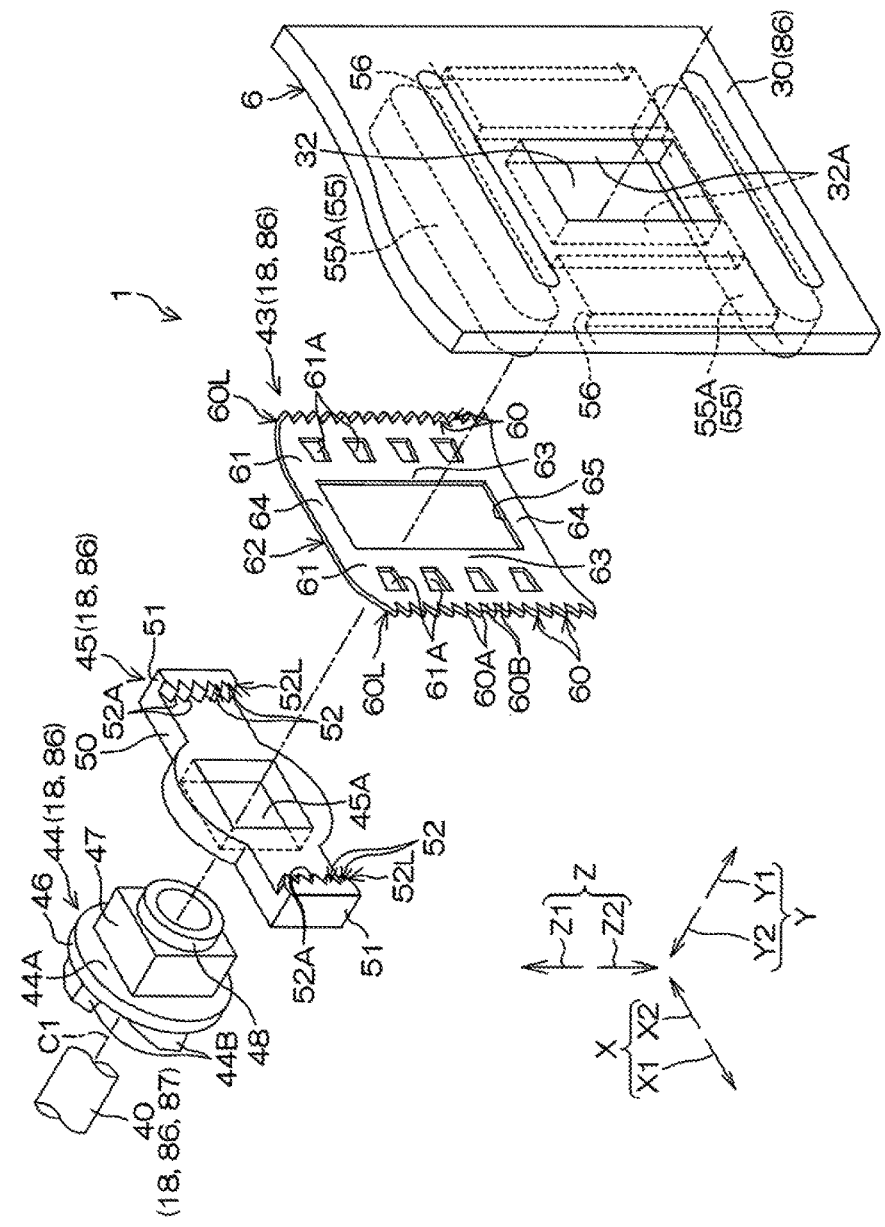
FIG. 4 is an exploded perspective view of components adjacent to a left lateral plate of an upper bracket.

FIG. 4 is an exploded perspective view of components adjacent to the lateral plate 30 of the upper bracket 6 on the left side Y2. Referring to FIG. 4, the clamping member 44 integrally includes an annular presser 46, a rotation restrictor 47, and a boss 48. The rotation restrictor 47 has a substantially cuboid shape and protrudes in the rightward direction Y1 from the presser 46. The boss 48 has a tubular shape and protrudes in the rightward direction Y1 from the rotation restrictor 47. The clamping member 44 further includes a pressing surface 44A that is the right lateral surface of the presser 46.

Referring to FIG. 3, the left lateral surface of the presser 46 of the clamping member 44 is provided with a cam protrusion 44B to be pressed onto a cam protrusion 42A on the right lateral surface of the cam 42. Unlike the clamping member 44 on the left side Y2, the clamping member 79 on the right side Y1 is provided with no cam protrusion 44B. Referring to FIG. 4, the movable member 45 adjoins the presser 46 of the clamping member 44 from the right side Y1. The movable member 45 integrally includes a body 50 elongated in the axial direction X, a pair of protrusions 51, and first tooth arrangements 52L. Each of the pair of protrusions 51 is protruded in the rightward direction Y1 from an associated one of the ends of the body 50 in the axial direction X. Each first tooth arrangement 52L is provided on an associated one of the protrusions 51. The body 50 is provided with a through hole 45A passing through the body 50 in the right-left direction Y. The through hole 45A has, for example, a quadrangular shape as viewed in the right-left direction Y. Each first tooth arrangement 52L includes a plurality of substantially triangular first teeth 52 aligned in the up-down direction Z.

The tooth member 43 adjoins the body 50 of the movable member 45 from the right side Y1. The tooth member 43 is, for example, a metal plate elastically deformable in the right-left direction Y. The tooth member 43 integrally includes a pair of second tooth arrangements 60L, a pair of elastic portions 61, and a body 62. Each of the pair of second tooth arrangements 60L is engageable with an associated one of the first tooth arrangements 52L. Each of the pair of elastic portions 61 supports an associated one of the second tooth arrangements 60L. Each of the pair of second tooth arrangements 60L includes a plurality of substantially triangular second teeth 60 aligned in the up-down direction Z. Each elastic portion 61 is coupled to an associated one of the ends of the body 62 in the axial direction X. Each second tooth arrangement 60L is coupled to an associated one of the elastic portions 61.

The body 62 includes: a pair of vertical frames 63 extending in the up-down direction Z; and a pair of horizontal frames 64 connecting the vertical frames 63 to each other. The pair of vertical frames 63 are disposed at a distance from each other in the axial direction X. The pair of horizontal frames 64 are disposed at a distance from each other in the up-down direction Z. The tooth member 43 is provided with a straight hole 65 elongated in the up-down direction Z. The straight hole 65 is a space defined by the pair of vertical frames 63 and the pair of horizontal frames 64.

The lateral plate 30 of the upper bracket 6 on the left side Y2 is provided with a movement restricting mechanism 55 to restrict movement of the tooth member 43 relative to the upper bracket 6 in the tilt direction C. The movement restricting mechanism 55 includes a pair of restrictors 55A extruded from the lateral plate 30 on the left side Y2. Each of the pair of restrictors 55A has a substantially cuboid shape elongated in the axial direction X. An upper one of the restrictors 55A is disposed on a portion of the lateral plate 30 located above the insertion hole 32 in the up-down direction Z. A lower one of the restrictors 55A is disposed on a portion of the lateral plate 30 located below the insertion hole 32 in the up-down direction Z.

Referring to FIG. 3, the lateral plate 30 on the right side Y1 is provided with a movement restricting mechanism 77. The movement restricting mechanism 77 on the right side Y1 and the movement restricting mechanism 55 on the left side Y2 are symmetrical with respect to the reference plane 3D, and thus description of the movement restricting mechanism 77 will be omitted. The clamping member 44 is supported by the outer periphery of the inserted shaft 40 such that the clamping member 44 is rotatable relative to the inserted shaft 40 around the central axis C1. The rotation restrictor 47 of the clamping member 44 is inserted through the through hole 45A of the movable member 45 from the left side Y2. Thus, the body 50 of the movable member 45 adjoins the presser 46 of the clamping member 44 from the right side Y1. The movable member 45 is supported by the clamping member 44 such that rotation of the movable member 45 relative to the clamping member 44 is restricted and the movable member 45 is movable together with the clamping member 44. The movable member 45 is supported by the lower jacket 23 via the clamping member 44 and the inserted shaft 40. The clamping member 44 and the movable member 45 are movable together with the inserted shaft 40 (or the column jacket 4) in the tilt direction C. The rotation restrictor 47 of the clamping member 44 is inserted through the through hole 45A of the movable member 45 and through the straight hole 65 of the tooth member 43 located on the right side Y1 relative to the through hole 45A such that the clamping member 44 is not rotatable relative to the movable member 45 or the tooth member 43. The straight hole 65 is a long hole elongated in the up-down direction Z. Thus, the rotation restrictor 47 is movable relative to the straight hole 65 in the up-down direction Z but is immovable relative to the straight hole 65 in the axial direction X. The inserted shaft 40 rotates relative to the tooth member 43, the clamping member 44, and the movable member 45 around the central axis C1.

The tooth member 43 is disposed between the restrictors 55A as viewed in the axial direction X. This restricts movement of the tooth member 43 relative to the upper bracket 6 in the up-down direction Z. Rotation of the tooth member 43 relative to the lateral plate 30 on the left side Y2 is restricted by the pair of restrictors 55A. This restriction prevents rotation of the clamping member 44 relative to the tooth member 43. None of the tooth member 43, the clamping member 44, and the movable member 45 is rotatable relative to the lateral plate 30 on the left side Y2.

The tooth member 43 is supported by the lateral plate 30 on the left side Y2 so that the tooth member 43 is located between the movable member 45 and the lateral plate 30 on the left side Y2 in the right-left direction Y. Specifically, the tooth member 43 is supported by the lateral plate 30 of the upper bracket 6 on the left side Y2 via the pair of restrictors 55A. The elastic portions 61 of the tooth member 43 are located between the body 50 of the movable member 45 and peripheral edges 32A of the insertion hole 32 of the lateral plate 30 on the left side Y2. The peripheral edges 32A are portions of the lateral plate 30 that define outer edges of the insertion hole 32 in the axial direction X. Each of the pair of restrictors 55A extends in the axial direction X. Thus, the restrictors 55A guide movement of the tooth member 43 relative to the lateral plate 30 on the left side Y2 in the axial direction X.

In response to an operation performed on the operating member 41, the cam 42 rotates, so that the cam protrusion 42A and the cam protrusion 44B are pressed onto each other. This results in movement of the clamping member 44 in the rightward direction Y1 along the central axis C1 of the inserted shaft 40. This movement causes the pressing surface 44A of the clamping member 44 to press the lateral plate 30 on the left side Y2 via the body 50 of the movable member 45 and the elastic portions 61 and the body 62 of the tooth member 43. Thus, the clamping members 44 and 79 clamp the pair of lateral plates 30.

In this case, each lateral plate 30 clamps an associated one of the clamped portions 34 of the lower jacket 23. This clamping restricts rotation of the lower jacket 23 in the tilt direction C, thus effecting "tilt locking". Clamping the clamped portions 34 causes the lower jacket 23 to be elastically reduced in diameter so as to clamp the upper jacket 22. Consequently, movement of the upper jacket 22 in the axial direction X is restricted, thus effecting "telescopic locking".

As used herein, the term "locked state" refers to a state of the steering system 1 where the position of the steering member 11 in the tilt direction C and the axial direction X is locked, i.e., a state of the steering system 1 where tilt locking and telescopic locking are effected. During normal driving, the steering system 1 is in the locked state. When the operating member 41 is rotated in a lock releasing direction, the cam 42 is rotated so as to move the clamping member 44 in a direction toward the cam 42 (i.e., in the leftward direction Y2) along the central axis C1. This movement releases the clamping of the pair of lateral plates 30 by the clamping members 44 and 79, thus enabling tilt adjustment and telescopic adjustment.

As used herein, the term "released state" refers to a state of the steering system 1 where the position of the steering member 11 in the tilt direction C and the axial direction X is unlocked, i.e., a state of the steering system 1 where tilt locking and telescopic locking are released. To stabilize initial restraint in a telescopic direction (i.e., the axial direction X) at the time of a secondary collision following a vehicle collision, the steering system 1 further includes a telescopic locking mechanism 83. The telescopic locking mechanism 83 includes a tubular lock member 80, a transmission member 81, and a lock plate 82 extending in the axial direction X. The lock member 80, the transmission member 81, and the lock plate 82 are disposed between the pair of clamped portions 34 as viewed in the axial direction X. The lock member 80 is rotatably supported by the inserted shaft 40. The lock plate 82 is secured to the upper jacket 22. The transmission member 81 includes: a cam to transmit rotation of the inserted shaft 40 to the lock member 80; and a spring to urge the lock member 80 to the lock plate 82.

In the locked state, a toothed portion 80A of the lock member 80 is in engagement with a toothed portion 82A of the lock plate 82. Thus, the position of the steering member 11 (see FIG. 1) in the axial direction X is firmly locked. In the released state, the toothed portion 80A is out of engagement with the toothed portion 82A. The steering system 1 further includes tilt locking mechanisms 86 and 87 to bring the first teeth 52 and the second teeth 60 into engagement with each other, thus firmly locking the position of the column jacket 4 in the tilt direction C.

The tilt locking mechanism 86 on the left side Y2 includes the lateral plate 30 on the left side Y2, the inserted shaft 40, the cam 42, the tooth member 43, the clamping member 44, and the movable member 45. The tilt locking mechanism 87 on the right side Y1 includes the lateral plate 30 on the right side Y1, the inserted shaft 40, the tooth member 71, the clamping member 79, and the movable member 72. The pair of first tooth arrangements 52L of the movable member 45 are disposed at a distance from each other in the axial direction X. The first teeth 52 of the first tooth arrangement 52L on the rear side X1 are protruded in the forward direction X2 from the protrusion 51 on the rear side X1, with the tips of the first teeth 52 facing in the forward direction X2. The first teeth 52 of the first tooth arrangement 52L on the front side X2 are protruded in the rearward direction X1 from the protrusion 51 on the front side X2, with the tips of the first teeth 52 facing in the rearward direction X1. The first teeth 52 of the first tooth arrangements 52L each include a tooth trace 52A extending in the right-left direction Y.

Figure 5:
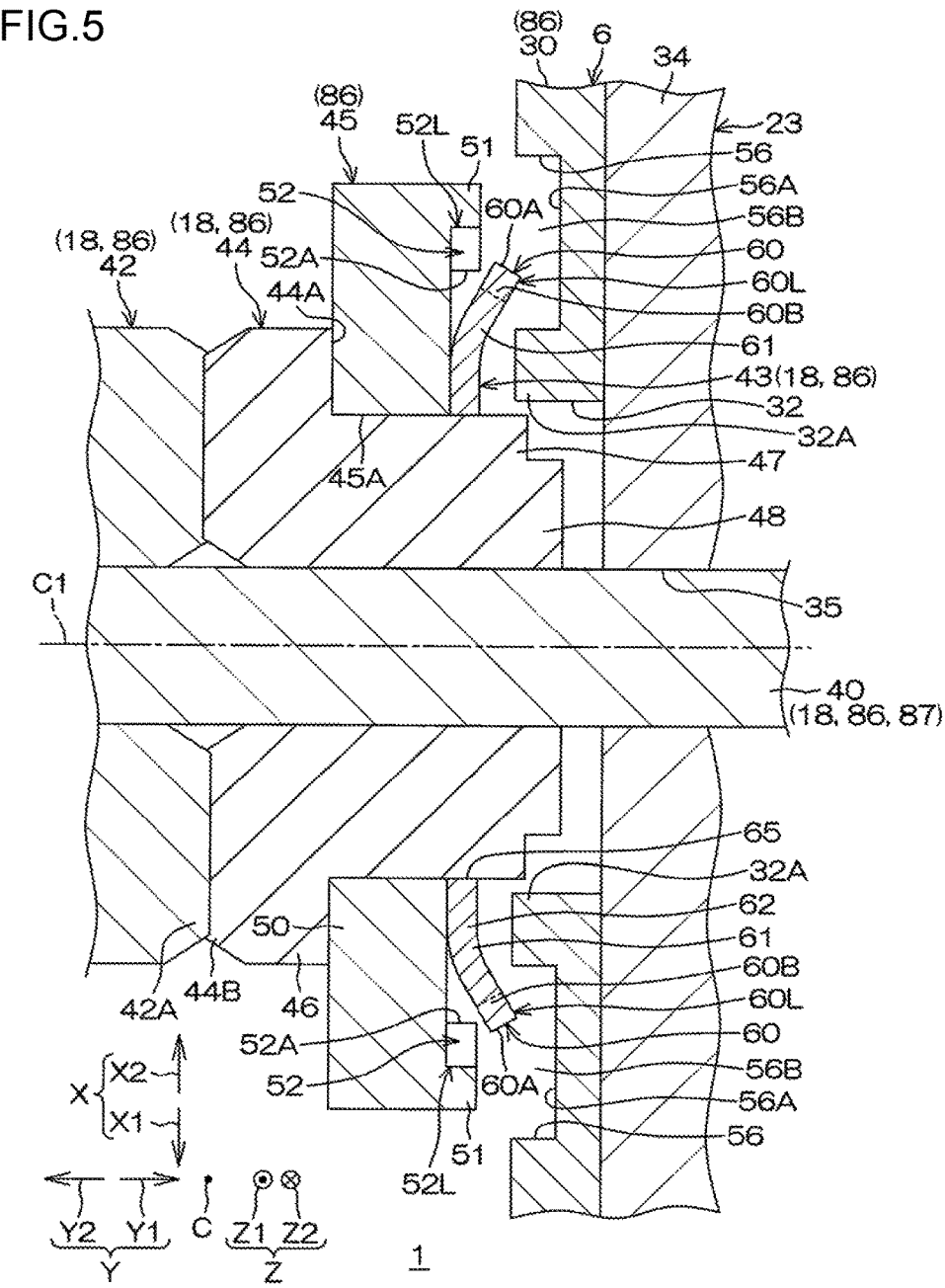
FIG. 5 is a schematic cross-sectional view of the steering system taken along the line V-V in FIG. 3, illustrating the steering system in a released state.

FIG. 5 is a schematic cross-sectional view of the steering system 1 taken along the line V-V in FIG. 3, illustrating the steering system 1 in the released state. Referring to FIG. 5, each elastic portion 61 of the tooth member 43 is curved so that the elastic portion 61 extends in the rightward direction Y1 as it extends away from the body 62 in the axial direction X. Each elastic portion 61 is curved to have a convex shape facing in the leftward direction Y2. Each elastic portion 61 may be provided with a plurality of holes 61A serving as rigidity reducing elements to reduce the rigidity of the tooth member 43 (see FIG. 4).

Each of the pair of second tooth arrangements 60L faces the associated first tooth arrangement 52L from the right side Y1. The elastic portions 61 support the second teeth 60 of the second tooth arrangements 60L, with the second teeth 60 inclined in the rightward direction Y1 (i.e., toward the upper bracket 6) such that the second teeth 60 are away from the first teeth 52 of the first tooth arrangements 52L. Specifically, the second tooth arrangement 60L on the front side X2 is provided on the front edge of the elastic portion 61 on the front side X2, and the second tooth arrangement 60L on the rear side X1 is provided on the rear edge of the elastic portion 61 on the rear side X1. The second teeth 60 of the second tooth arrangement 60L on the front side X2 are protruded in the forward direction X2 and the rightward direction Y1 from the front edge of the elastic portion 61 on the front side X2, with the tips of the second teeth 60 facing in the forward direction X2 and the rightward direction Y1. The second teeth 60 of the second tooth arrangement 60L on the rear side X1 are protruded in the rearward direction X1 and the rightward direction Y1 from the rear edge of the elastic portion 61 on the rear side X1, with the tips of the second teeth 60 facing in the rearward direction X1 and the rightward direction Y1.

The tip of each of the second teeth 60 of the second tooth arrangements 60L includes a tooth trace 60A extending obliquely relative to the right-left direction Y. A root 60B of each of the second teeth 60 is integral with and supported by the associated elastic portion 61. Although the tooth member 43 is elastically deformable in the right-left direction Y as previously mentioned, an entirety of the tooth member 43 does not necessarily have to be elastically deformable in the right-left direction Y. At least the pair of elastic portions 61 of the tooth member 43 are required to be elastically deformable in the right-left direction Y. The tooth member 43 adjoins, from the left side Y2, the lateral plate 30 on the left side Y2 (see FIG. 3).

Portions of the lateral plate 30 on the left side Y2 that are located outward of the pair of peripheral edges 32A in the axial direction X are provided with recesses 56. Each recess 56 is a portion of the lateral plate 30 recessed in the rightward direction Y1. A bottom surface 56A of each recess 56 faces an associated one of the first tooth arrangements 52L from the right side Y1. The peripheral edges 32A of the insertion hole 32 face the pair of elastic portions 61 of the tooth member 43 from the right side Y1.

Referring to FIG. 3, the lateral plate 30 on the right side Y1 is provided with a pair of recesses 78. The pair of recesses 78 in the lateral plate 30 on the right side Y1 and the pair of recesses 56 in the lateral plate 30 on the left side Y2 are symmetrical with respect to the reference plane 3D. In FIG. 3, only one of the pair of recesses 56 and only one of the pair of recesses 78 are illustrated.

The following description discusses how the first tooth arrangements 52L come into engagement with the second tooth arrangements 60L. When the driver moves the steering member 11 (see FIG. 1) in the tilt direction C so as to effect tilt adjustment, an entirety of the column jacket 4 (see FIG. 1) tilts relative to the upper bracket 6. Tilt adjustment of the steering member 11 is effected within a range in which the rotation restrictor 47 and the boss 48 of the clamping member 44 are movable within the insertion hole 32 in the tilt direction C.

Figure 6:
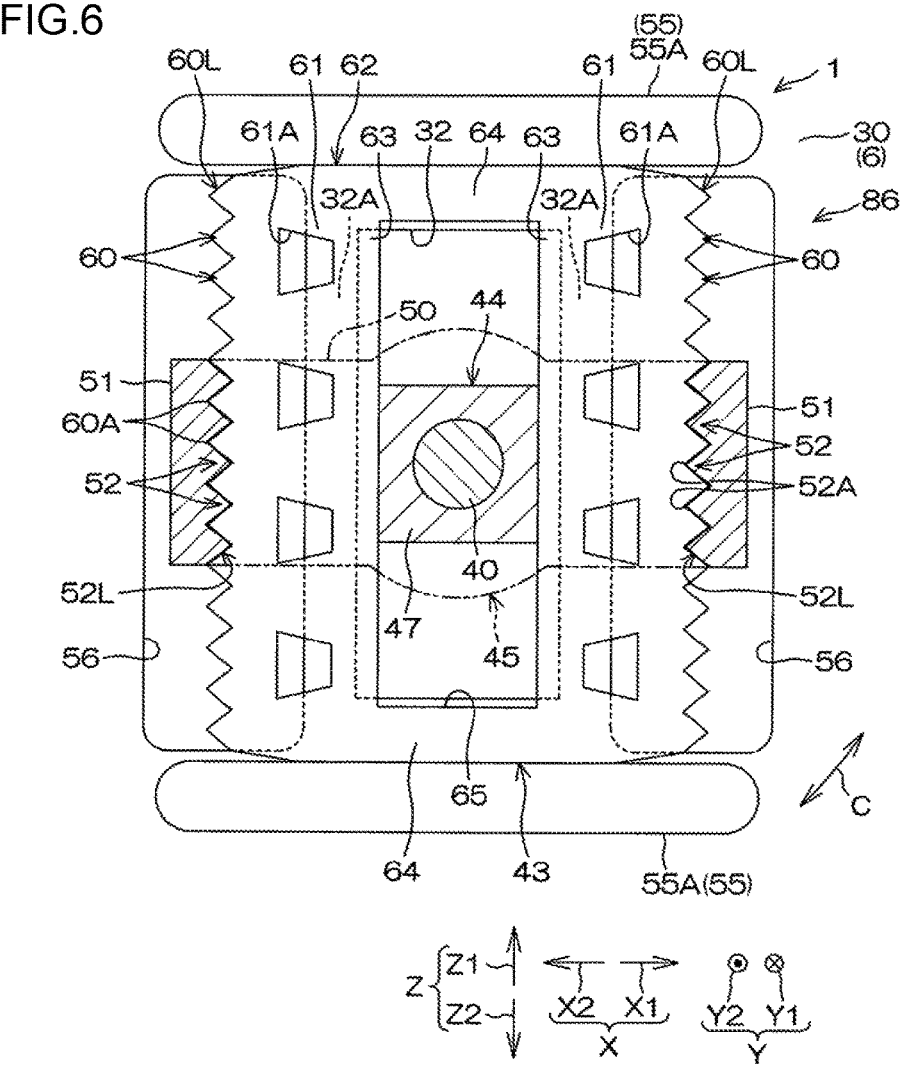
FIG. 6 is a schematic cross-sectional view of the steering system taken along the line VI-VI in FIG. 3.
Figure 7:
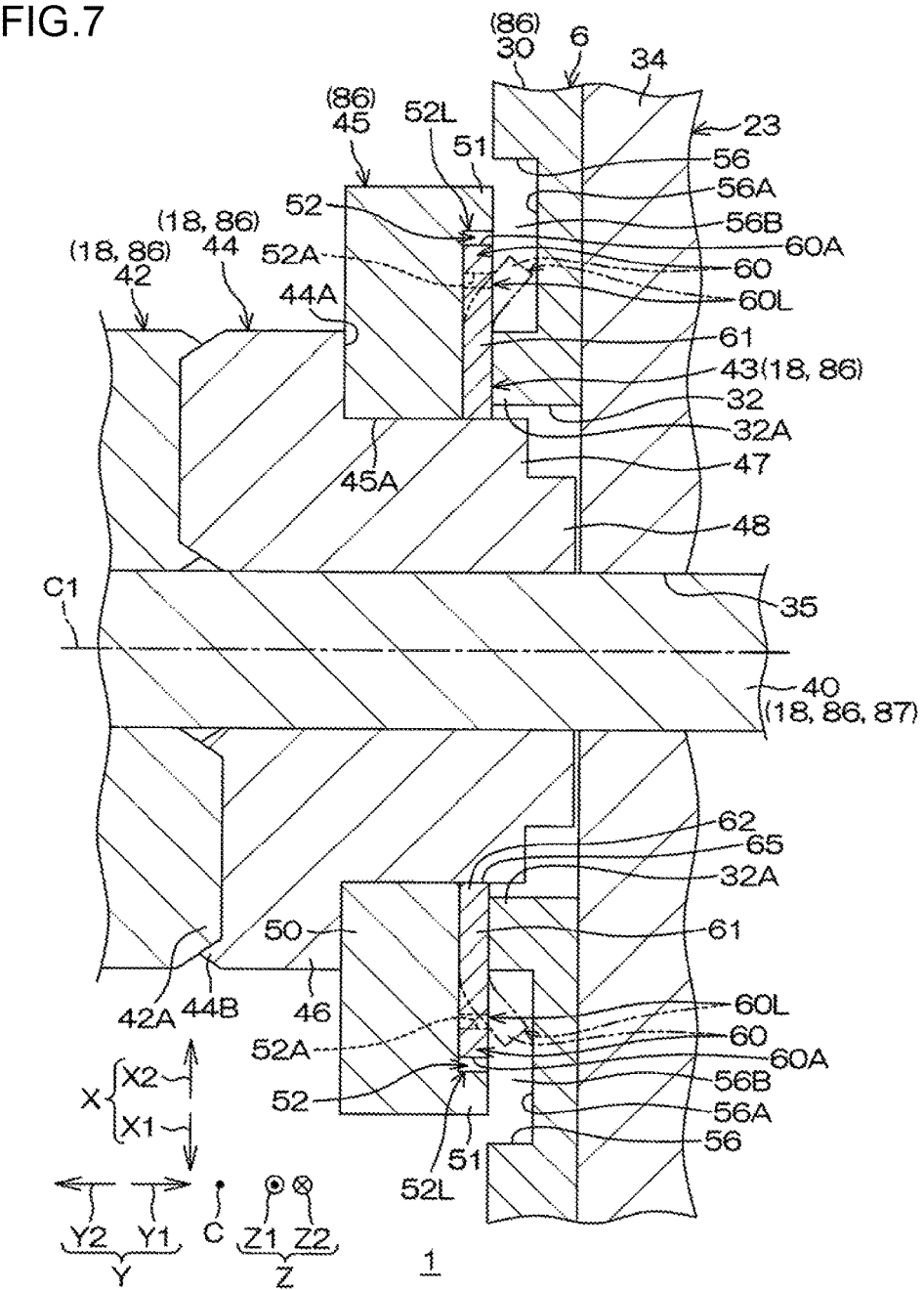
FIG. 7 is a schematic cross-sectional view equivalent to FIG. 5, illustrating the steering system in a locked state.

The rotation restrictor 47 that moves together with the movable member 45 is inserted through the straight hole 65 of the tooth member 43. Thus, the movable member 45 is movable relative to the tooth member 43 in the up-down direction Z, and movable together with the tooth member 43 in the axial direction X. Consequently, the first tooth arrangements 52L and the second tooth arrangements 60L move relative to each other in the up-down direction Z. FIG. 6 is a schematic cross-sectional view taken along the line VI-VI in FIG. 3. Although the body 50 of the movable member 45 is actually invisible in the cross section taken along the line VI-VI, the body 50 is indicated by the long dashed double-short dashed lines for the convenience of description. FIG. 7 is a schematic cross-sectional view equivalent to FIG. 5, illustrating the steering system 1 in the locked state.

As illustrated in FIG. 6, after tilt adjustment, the driver operates the operating member 41, with the second teeth 60 of the second tooth arrangements 60L not overlapping with the first teeth 52 of the first tooth arrangements 52L as viewed from the left side Y2. The clamping member 44 and the movable member 45 are moved in the rightward direction Y1 so that the clamping member 44 and the movable member 45 come close to the lateral plate 30 on the left side Y2. This reduces the distance between the lateral plate 30 on the left side Y2 and the movable member 45 in the right-left direction Y. The movable member 45 abuts against the tooth member 43 from the left side Y2, and the lateral plate 30 on the left side Y2 abuts against the tooth member 43 from the right side Y1. This further reduces the distance between the lateral plate 30 on the left side Y2 and the movable member 45 in the right-left direction Y. Thus, the pair of elastic portions 61 are sandwiched between the movable member 45 and the lateral plate 30 on the left side Y2. This results in elastic deformation of the pair of elastic portions 61 so that the second tooth arrangements 60L come close to the first tooth arrangements 52L. Specifically, the pair of elastic portions 61 are elastically deformed so that the curved shape of each elastic portion 61 changes to a substantially straight shape extending in the axial direction X. Consequently, in accordance with the position of the steering member 11 that has undergone tilt adjustment, the second teeth 60 of the second tooth arrangements 60L come into engagement with the first teeth 52 of the first tooth arrangements 52L from the right side Y1. With the first teeth 52 of the first tooth arrangements 52L in engagement with the second teeth 60 of the second tooth arrangements 60L, the tooth traces 52A of the first teeth 52 and the tooth traces 60A of the second teeth 60 extend in the right-left direction Y (see FIG. 7). Thus, the tooth member 43 is configured so that the second tooth arrangements 60L are in engagement with the first tooth arrangements 52L, with the pair of elastic portions 61 sandwiched between the movable member 45 and the lateral plate 30 on the left side Y2 and elastically deformed. Providing the plurality of holes 61A serving as rigidity reducing elements in each elastic portion 61 facilitates elastic deformation of each elastic portion 61 so as to incline the second teeth 60.

Suppose that the driver operates the operating member 41 so as to move the movable member 45 in the rightward direction Y1, with the second teeth 60 of the second tooth arrangements 60L overlapping with the first teeth 52 of the first tooth arrangements 52L as viewed from the left side Y2. In this case, the movement of the movable member 45 in the rightward direction Y1 reduces the distance between the lateral plate 30 on the left side Y2 and the movable member 45 in the right-left direction Y. Thus, the first tooth arrangements 52L ride on the second tooth arrangements 60L before the pressing surface 44A of the clamping member 44 presses the lateral plate 30 on the left side Y2. As used herein, the term "tooth-on-tooth state" refers to a state of the steering system 1 where the first tooth arrangements 52L ride on the second tooth arrangements 60L, with the first tooth arrangements 52L out of engagement with the second tooth arrangements 60L.

The recesses 56 are provided in the portions of the lateral plate 30 on the left side Y2 that face the first tooth arrangements 52L of the tooth member 43. This means that spaces 56B are present on the right side Y1 relative to the first tooth arrangements 52L. Thus, in the tooth-on-tooth state, the second teeth 60 of the second tooth arrangements 60L riding on the first tooth arrangements 52L are elastically deformed and inclined in the rightward direction Y1 so as to be located inside the spaces 56B as indicated by the long dashed double-short dashed lines in FIG. 7.

When the second teeth 60 are located inside the spaces 56B in this manner, the pressing surface 44A of the clamping member 44 presses the lateral plate 30 on the left side Y2 via the body 50 of the movable member 45 and the elastic portions 61 and the body 62 of the tooth member 43. Accordingly, the steering system 1 will reach the locked state without preventing rotation of the operating member 41 (see FIG. 3) in the course of the operation.

The steering system 1 is brought into the locked state irrespective of the positional relationship between the first tooth arrangements 52L and the second tooth arrangements 60L. In other words, the steering system 1 is brought into the locked state irrespective of the position of the steering member 11 after tilt adjustment. This means that what is called "stepless locking" is effected. Switching the steering system 1 from the locked state to the released state causes the clamping member 44 and the movable member 45 to move away from the lateral plate 30 on the left side Y2 in the leftward direction Y2. This movement increases the distance between the movable member 45 and the lateral plate 30 on the left side Y2 in the right-left direction Y, so that the movable member 45 and the lateral plate 30 on the left side Y2 cease pressing the pair of elastic portions 61 of the tooth member 43. Thus, the tooth member 43 returns to its original shape from the elastically deformed shape. Specifically, the elastic portions 61 of the tooth member 43 each return to its curved shape, with the second tooth arrangements 60L inclined toward the lateral plate 30 (i.e., toward the upper bracket 6) such that the second tooth arrangements 60L are away from the first tooth arrangements 52L. Consequently, the second tooth arrangements 60L are out of engagement with the first tooth arrangements 52L.

As described thus far, the elastic deformation of the elastic portions 61 supporting the second tooth arrangements 60L brings the first tooth arrangements 52L into engagement with the second tooth arrangements 60L. Returning each elastic portion 61 to its original shape from the elastically deformed shape brings the first tooth arrangements 52L out of engagement with the second tooth arrangements 60L. Accordingly, this embodiment makes it unnecessary to provide, in addition to the elastic portions 61 supporting the second tooth arrangements 60L, any other component, element, or portion that elastically deforms so as to bring the first tooth arrangements 52L out of engagement with the second tooth arrangements 60L. This results in a reduction in the size of the tooth member 43. The number of components of the steering system 1 is smaller than the number of components of a steering system configured to include, in addition to the tooth member 43, a component, such as a spring, that elastically deforms so as to bring the first tooth arrangements 52L out of engagement with the second tooth arrangements 60L. Consequently, this embodiment reduces the number of components of the resulting steering system and the size of the tooth member 43.

Each elastic portion 61 is curved to have a convex shape facing in the leftward direction Y2 (i.e., facing the movable member 45). This facilitates elastic deformation of the elastic portions 61 between the movable member 45 and the lateral plate 30 on the left side Y2. The tilt locking mechanism 87 on the right side Y1 performs functions similar to those of the tilt locking mechanism 86 on the left side Y2. Suppose that a secondary collision has occurred, with the first tooth arrangements 52L riding on the second tooth arrangements 60L (see the long dashed double-short dashed lines in FIG. 7). In this case, the movable member 45 moves relative to the tooth member 43 in the up-down direction Z. This movement brings the first tooth arrangements 52L out of the state in which the first tooth arrangements 52L ride on the second tooth arrangements 60L. Thus, the second teeth 60 of the second tooth arrangements 60L, which the first tooth arrangements 52L no longer ride on, are elastically deformed, so that the second teeth 60 come into engagement with the first teeth 52 of the first tooth arrangements 52L so as to maintain the position of the steering member 11 in the up-down direction Z.

Figure 8:
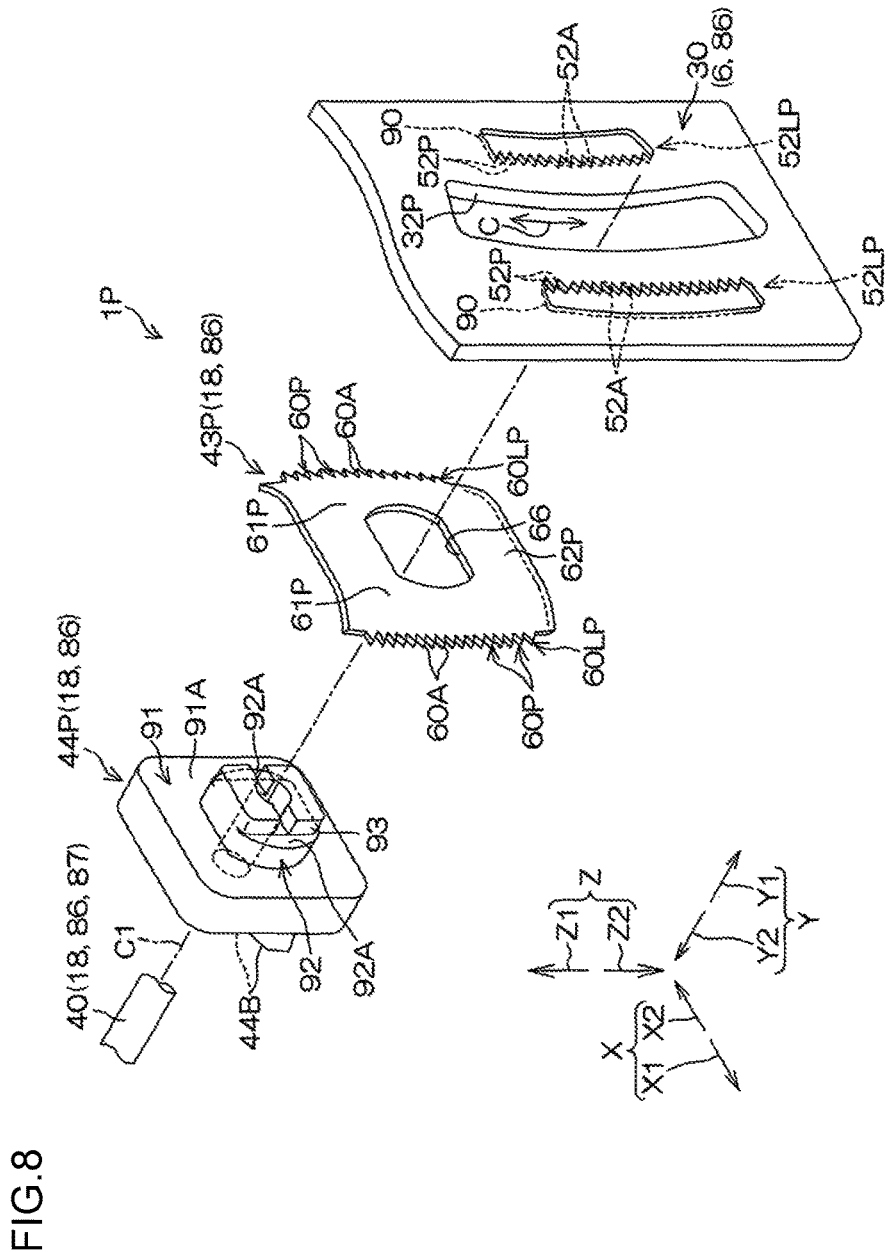
FIG. 8 is an exploded perspective view of components adjacent to a left lateral plate of an upper bracket of a steering system according to a second embodiment of the invention.
Figure 9:
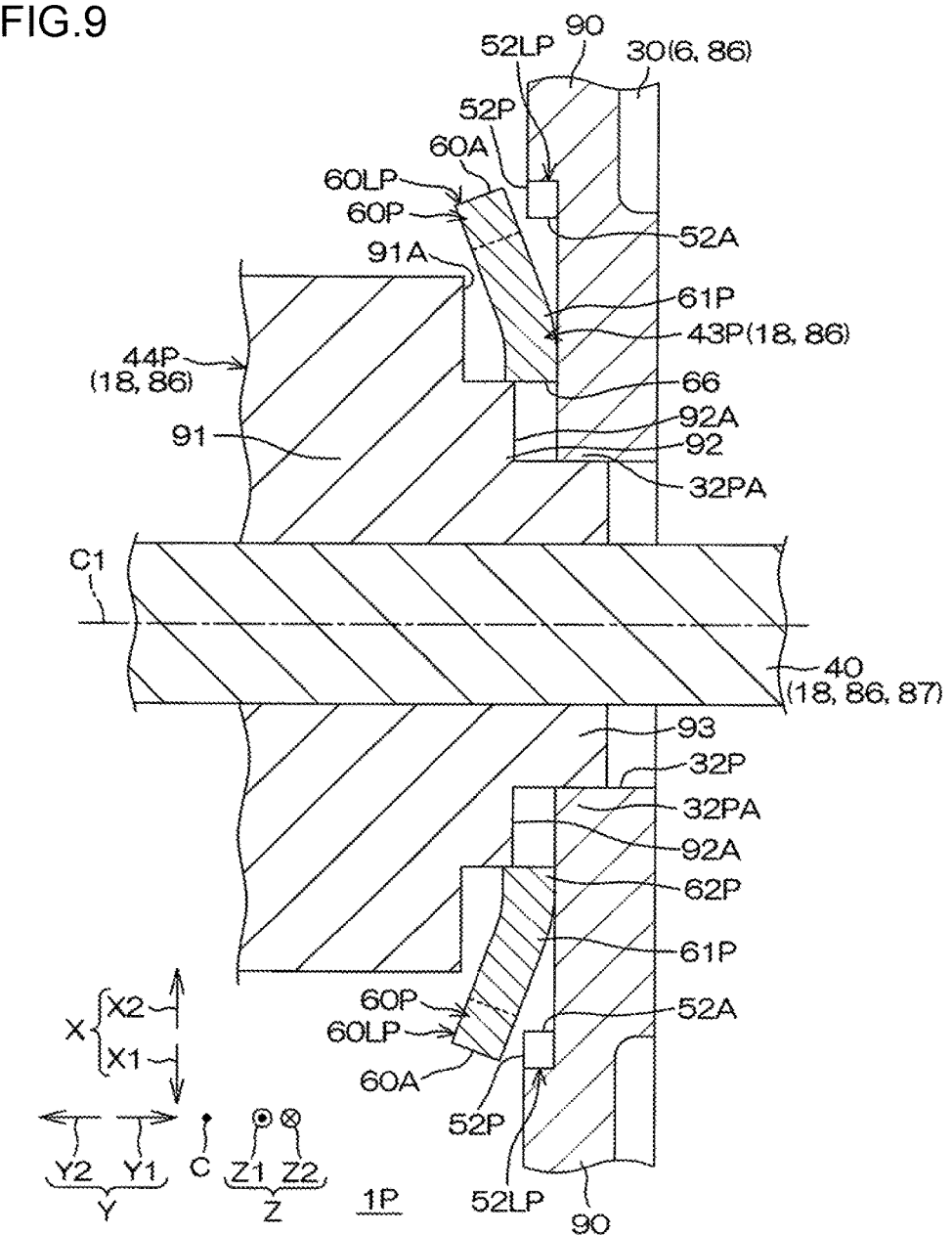
FIG. 9 is a schematic cross-sectional view of the steering system according to the second embodiment, illustrating the steering system in the released state.
Figure 10:
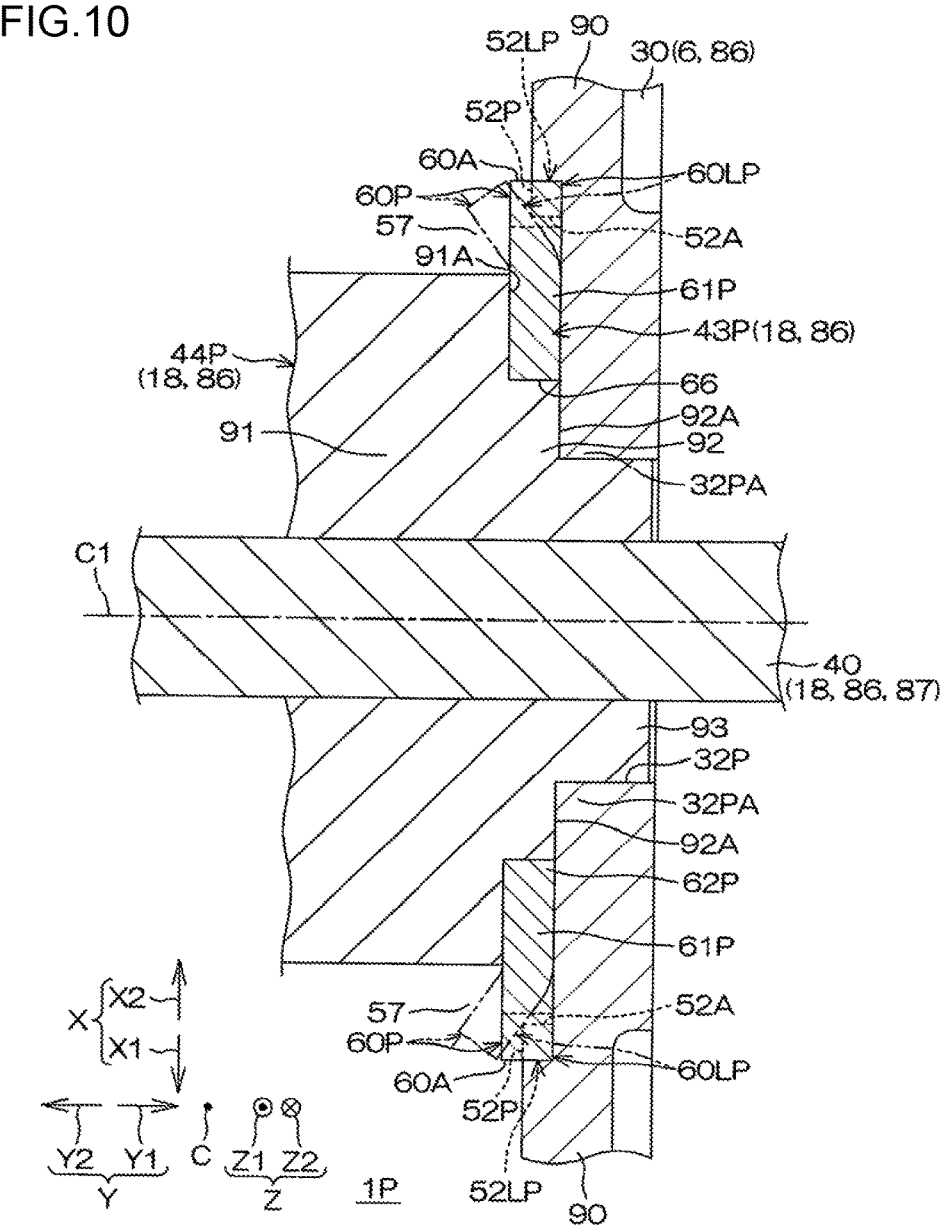
FIG. 10 is a schematic cross-sectional view equivalent to FIG. 9, illustrating the steering system in the locked state.

A steering system 1P according to a second embodiment of the invention will be described below. FIG. 8 is an exploded perspective view of components adjacent to the left lateral plate 30 of the upper bracket 6 of the steering system 1P according to the second embodiment of the invention. FIG. 9 is a schematic cross-sectional view of the steering system 1P in the released state. FIG. 10 is a schematic cross-sectional view equivalent to FIG. 9, illustrating the steering system 1P in the locked state. Components illustrated in FIGS. 8 to 10 and corresponding to those already described are identified by the same reference signs, and description thereof will be omitted. Although the description of the second embodiment is focused on the tilt locking mechanism 86 on the left side Y2, this embodiment is applicable to the tilt locking mechanism 87 on the right side Y1.

The main differences between the steering system 1P according to the second embodiment and the steering system 1 according to the first embodiment (see FIG. 4) are that first tooth arrangements 52LP are provided on the lateral plate 30 of the upper bracket 6, and elastic portions 61P of a tooth member 43P support second tooth arrangements 60LP such that the second tooth arrangements 60LP are inclined toward a clamping member 44P serving as a movable member. The steering system 1P according to the second embodiment includes neither the movable member 45 nor the movable member 72 (see FIG. 3).

Referring to FIG. 8, the first tooth arrangements 52LP are held by holders 90 provided on the lateral plate 30 on the left side Y2. The holders 90 are provided on the lateral plate 30 on the left side Y2, each holder 90 located outward of an insertion hole 32P in the axial direction X. The insertion hole 32P according to the second embodiment is a tilt groove extending in the tilt direction C. Each holder 90 has a substantially rectangular shape extending in the tilt direction C. Each of the pair of first tooth arrangements 52LP protrudes toward the insertion hole 32P from the associated holder 90. Each holder 90 is extruded from the lateral plate 30 in the leftward direction Y2 using, for example, an extrusion die. Thus, the first tooth arrangements 52LP and the lateral plate 30 are of a single-piece construction in which the first tooth arrangements 52LP and the lateral plate 30 are integral with each other. Alternatively, each holder 90 may be a component separate from the lateral plate 30. In such a case, the holders 90 holding the first tooth arrangements 52LP are secured to the lateral plate 30, so that the first tooth arrangements 52LP are provided on the lateral plate 30.

The pair of first tooth arrangements 52LP are disposed at a distance from each other in the axial direction X. The first tooth arrangement 52LP on the rear side X1 and the first tooth arrangement 52LP on the front side X2 face each other in the axial direction X. Each first tooth arrangement 52LP includes a plurality of first teeth 52P aligned at regular intervals in the tilt direction C. The tips of the first teeth 52P of the first tooth arrangement 52LP on the front side X2 face toward the insertion hole 32P (i.e., in the rearward direction X1). The tips of the first teeth 52P of the first tooth arrangement 52LP on the rear side X1 face toward the insertion hole 32P (i.e., in the forward direction X2).

The clamping member 44P integrally includes a first presser 91, a second presser 92, and a boss 93. The first presser 91 presses the tooth member 43P. The second presser 92 presses the lateral plate 30 on the left side Y2. The boss 93 prevents rotation of the clamping member 44P relative to the lateral plate 30. The first presser 91 has a substantially quadrangular shape as viewed in the right-left direction Y. The right lateral surface of the first presser 91 will hereinafter be referred to as a "first pressing surface 91A". The second presser 92 is protruded in the rightward direction Y1 from the first pressing surface 91A of the first presser 91. The right lateral surface of the second presser 92 includes a pair of substantially semicircular second pressing surfaces disposed at a distance from each other in the axial direction X. Each of the second pressing surfaces will hereinafter be referred to as a "second pressing surface 92A".

The boss 93 has a substantially quadrangular shape as viewed in the right-left direction Y. The boss 93 is protruded in the rightward direction Y1 from between the pair of second pressing surfaces 92A. The lateral surfaces of the boss 93 in the axial direction X extend in the tilt direction C so that the lateral surfaces of the boss 93 move along the edges of the insertion hole 32P extending in the tilt direction C. Similarly to the clamping member 44 according to the first embodiment, the clamping member 44P adjoins the cam 42 from the right side Y1. The clamping member 44P is provided with the cam protrusion 44B that is to be pressed onto the cam protrusion 42A (see FIG. 3) of the cam 42.

The pair of second pressing surfaces 92A of the second presser 92 of the clamping member 44P are configured to abut, from the left side Y2, against peripheral edges 32PA of the insertion hole 32P in the lateral plate 30 of the upper bracket 6 on the left side Y2. The tooth member 43P integrally includes: a pair of the second tooth arrangements 60LP; a pair of the elastic portions 61P each supporting the associated second tooth arrangement 60LP; and a body 62P. Each of the pair of second tooth arrangements 60LP includes a plurality of substantially triangular second teeth 60P aligned in the tilt direction C. Each elastic portion 61P is coupled to an associated one of the ends of the body 62P in the axial direction X. Each second tooth arrangement 60LP is coupled to the associated elastic portion 61P. Specifically, the second tooth arrangement 60LP on the front side X2 is provided on the front edge of the elastic portion 61P on the front side X2, and the second tooth arrangement 60LP on the rear side X1 is provided on the rear edge of the elastic portion 61P on the rear side X1.

The body 62P has a substantially rectangular shape extending in the tilt direction C. A portion of the body 62P located substantially centrally in the axial direction X and the up-down direction Z is provided with a through hole 66 passing through the body 62P in the right-left direction Y. Referring to FIG. 9, each of the pair of second tooth arrangements 60LP faces the associated first tooth arrangement 52LP from the left side Y2. The elastic portions 61P support the second tooth arrangements 60LP, with the second tooth arrangements 60LP inclined in the leftward direction Y2 (i.e., toward the clamping member 44P) such that the second tooth arrangements 60LP are away from the first tooth arrangements 52LP. Specifically, the second teeth 60P of the second tooth arrangement 60LP on the front side X2 are protruded in the forward direction X2 and the leftward direction Y2 from the front edge of the elastic portion 61P on the front side X2, and the second teeth 60P of the second tooth arrangement 60LP on the rear side X1 are protruded in the rearward direction X1 and the leftward direction Y2 from the rear edge of the elastic portion 61P on the rear side X1.

The clamping member 44P is supported by the outer periphery of the inserted shaft 40 such that the clamping member 44P is rotatable relative to the inserted shaft 40 around the central axis C1. The clamping member 44P is movable together with the inserted shaft 40 in the tilt direction C. The boss 93 of the clamping member 44P is inserted into the insertion hole 32P in the lateral plate 30 on the left side Y2 such that the clamping member 44P is not rotatable relative to the lateral plate 30 on the left side Y2. The second presser 92 of the clamping member 44P is inserted into the through hole 66 of the tooth member 43P such that the clamping member 44P is not rotatable relative to the tooth member 43P but movable together with the tooth member 43P. Thus, the tooth member 43P is supported by the inserted shaft 40 via the clamping member 44P. Consequently, the tooth member 43P is movable together with the inserted shaft 40 (or the column jacket 4) in the tilt direction C.

The tooth member 43P is located between the clamping member 44P and the lateral plate 30 on the left side Y2 in the right-left direction Y. Specifically, the elastic portions 61P of the tooth member 43P are located between the first presser 91 of the clamping member 44P and the peripheral edges 32PA of the insertion hole 32P in the lateral plate 30 on the left side Y2. Referring to FIG. 10, in response to an operation performed on the operating member 41, the cam 42 rotates, so that the cam protrusion 42A and the cam protrusion 44B are pressed onto each other. This causes the clamping member 44P to move in the rightward direction Y1 along the central axis C1 of the inserted shaft 40. Then, the first pressing surface 91A of the clamping member 44P presses the lateral plate 30 on the left side Y2 via the elastic portions 61P and the body 62P of the tooth member 43P. Thus, the clamping mechanism 18 clamps the pair of lateral plates 30 so as to effect tilt locking. Clamping the clamped portions 34 between the pair of lateral plates 30 causes the lower jacket 23 to be elastically reduced in diameter so as to clamp the upper jacket 22. This results in telescopic locking.

The following description discusses how the first tooth arrangements 52LP come into engagement with the second tooth arrangements 60LP. After tilt adjustment, the driver operates the operating member 41, with the second teeth 60P of the second tooth arrangements 60LP not overlapping with the first teeth 52P of the first tooth arrangements 52LP as viewed from the left side Y2. The clamping member 44P is moved in the rightward direction Y1 so that the clamping member 44P comes close to the lateral plate 30 on the left side Y2. This reduces the distance between the lateral plate 30 on the left side Y2 and the clamping member 44P in the right-left direction Y. The clamping member 44P abuts against the tooth member 43P from the left side Y2, and the lateral plate 30 on the left side Y2 abuts against the tooth member 43P from the right side Y1. This further reduces the distance between the lateral plate 30 on the left side Y2 and the clamping member 44P in the right-left direction Y. Thus, the pair of elastic portions 61P are sandwiched between the clamping member 44P and the lateral plate 30 on the left side Y2. This results in elastic deformation of the pair of elastic portions 61P so that the second tooth arrangements 60LP come close to the first tooth arrangements 52LP. Specifically, the pair of elastic portions 61P are elastically deformed so that the curved shape of each elastic portion 61P changes to a substantially straight shape extending in the axial direction X. Consequently, in accordance with the position of the steering member 11 that has undergone tilt adjustment, the second teeth 60P of the second tooth arrangements 60LP come into engagement with the first teeth 52P of the first tooth arrangements 52LP from the left side Y2. With the first teeth 52P of the first tooth arrangements 52LP in engagement with the second teeth 60P of the second tooth arrangements 60LP, the tooth traces 52A of the first teeth 52P and the tooth traces 60A of the second teeth 60P extend in the right-left direction Y. Thus, the tooth member 43P is configured so that the second tooth arrangements 60LP are in engagement with the first tooth arrangements 52LP, with the pair of elastic portions 61P sandwiched between the clamping member 44P and the lateral plate 30 on the left side Y2 and elastically deformed.

Suppose that when the clamping member 44P is moved in the rightward direction Y1, the second teeth 60P of the second tooth arrangements 60LP are overlapping with the first teeth 52P of the first tooth arrangements 52LP as viewed from the left side Y2. In this case, the first tooth arrangements 52LP ride on the second tooth arrangements 60LP before the second pressing surfaces 92A of the clamping member 44P press the lateral plate 30 on the left side Y2. This results in the tooth-on-tooth state. In the tooth-on-tooth state, the second teeth 60P of the second tooth arrangements 60LP riding on the first tooth arrangements 52LP are elastically deformed and inclined in the leftward direction Y2.

In the tooth-on-tooth state, the second teeth 60P of the second tooth arrangements 60LP riding on the first tooth arrangements 52LP are located in spaces 57 outward of the clamping member 44P in the axial direction X as indicated by the long dashed double-short dashed lines in FIG. 10. If the first tooth arrangements 52LP and the second tooth arrangements 60LP are in the tooth-on-tooth state, the second pressing surfaces 92A of the clamping member 44P would press the peripheral edges 32PA of the insertion hole 32P in the lateral plate 30 on the left side Y2 as long as the second teeth 60P are located in the spaces 57. Accordingly, the steering system 1P will reach the locked state without preventing rotation of the operating member 41 (see FIG. 3) in the course of the operation.

Switching the steering system 1P from the locked state to the released state moves the clamping member 44P away from the lateral plate 30 on the left side Y2 in the leftward direction Y2. This movement increases the distance between the clamping member 44P and the lateral plate 30 on the left side Y2 in the right-left direction Y, so that the clamping member 44P and the lateral plate 30 on the left side Y2 cease pressing the pair of elastic portions 61P of the tooth member 43P. Thus, the tooth member 43P returns to its original shape from the elastically deformed shape. Specifically, the elastic portions 61P of the tooth member 43P each return to its curved shape, with the second tooth arrangements 60LP inclined in the leftward direction Y2 (i.e., toward the clamping member 44P) such that the second teeth 60P are away from the first teeth 52P. Consequently, the second tooth arrangements 60LP are out of engagement with the first tooth arrangements 52LP.

As described thus far, the elastic deformation of the elastic portions 61P supporting the second tooth arrangements 60LP brings the first tooth arrangements 52LP into engagement with the second tooth arrangements 60LP. Returning each elastic portion 61P to its original shape from the elastically deformed shape brings the first tooth arrangements 52LP out of engagement with the second tooth arrangements 60LP. Accordingly, this embodiment makes it unnecessary to provide, in addition to the elastic portions 61P supporting the second tooth arrangements 60LP, any other component, element, or portion that is elastically deformable so as to bring the first tooth arrangements 52LP out of engagement with the second tooth arrangements 60LP. This results in a reduction in the size of the tooth member 43P. The number of components of the steering system 1P is smaller than the number of components of a steering system configured to include a component, such as a spring, that is separate from the tooth member 43P so as to bring the second tooth arrangements 60LP out of engagement with the first tooth arrangements 52LP. Consequently, this embodiment reduces the number of components of the resulting steering system and the size of the tooth member 43P.

Each elastic portion 61P is curved to have a convex shape facing in the rightward direction Y1 (i.e., facing the lateral plate 30 on the left side Y2). This facilitates elastic deformation of the elastic portions 61P between the clamping member 44P and the lateral plate 30 on the left side Y2. The invention is not limited to the embodiments described above, but various changes or modifications may be made within the scope of the claims. Each elastic portion 61 does not necessarily have to be curved to have a convex shape facing in the leftward direction Y2. The elastic portions 61 are required to be configured as follows: the elastic portions 61 support the second tooth arrangements 60L, with the second tooth arrangements 60L inclined such that the second tooth arrangements 60L are away from the first tooth arrangements 52L, and elastic deformation of the elastic portions 61 causes the second tooth arrangements 60L to come close to the first tooth arrangements 52L and come into engagement with the first tooth arrangements 52L. In one example, each elastic portion 61 may be curved to have a convex shape facing in the rightward direction Y1. In another example, each elastic portion 61 may have a sub-portion curved to have a convex shape facing in the rightward direction Y1, and a sub-portion curved to have a convex shape facing in the leftward direction Y2.

Each elastic portion 61P does not necessarily have to be curved to have a convex shape facing in the rightward direction Y1. The elastic portions 61P are required to be configured as follows: the elastic portions 61P support the second tooth arrangements 60LP, with the second tooth arrangements 60LP inclined such that the second tooth arrangements 60LP are away from the first tooth arrangements 52LP, and elastic deformation of the elastic portions 61P causes the second tooth arrangements 60LP to come close to the first tooth arrangements 52LP and come into engagement with the first tooth arrangements 52LP. In one example, each elastic portion 61P may be curved to have a convex shape facing in the leftward direction Y2. In another example, each elastic portion 61P may have a sub-portion curved to have a convex shape facing in the rightward direction Y1, and a sub-portion curved to have a convex shape facing in the leftward direction Y2.

The first tooth arrangements 52L and the second tooth arrangements 60L may each include a plurality of teeth having tooth traces extending perpendicularly to the direction in which the first tooth arrangements 52L and the second tooth arrangements 60L face each other (i.e., the right-left direction Y). In other words, the first tooth arrangements 52L and the second tooth arrangements 60L may each include a plurality of teeth projecting in the right-left direction Y. The first tooth arrangements 52LP and the second tooth arrangements 60LP may each include a plurality of teeth having tooth traces extending perpendicularly to the direction in which the first tooth arrangements 52LP and the second tooth arrangements 60LP face each other (i.e., the right-left direction Y). In other words, the first tooth arrangements 52LP and the second tooth arrangements 60LP may each include a plurality of teeth projecting in the right-left direction Y. Either each first tooth arrangement 52L or each second tooth arrangement 60L may include a single tooth. In such a case, each first tooth arrangement 52L may include a single first tooth 52, and each second tooth arrangement 60L may include a plurality of second teeth 60. Alternatively, each first tooth arrangement 52L may include a plurality of first teeth 52, and each second tooth arrangement 60L may include a single second tooth 60. The same goes for the first tooth arrangements 52LP and the second tooth arrangements 60LP according to the second embodiment.

The rigidity reducing elements are not limited to the holes 61A but may be dents or cut-outs that reduce the thickness of the elastic portions 61 or 61P in the right-left direction Y. The clamping member 44 and the movable member 45 may be of a single-piece construction in which the clamping member 44 and the movable member 45 are integral with each other. Unlike the first and second embodiments, each of the steering systems 1 and 1P may include either one of the tilt locking mechanism 86 on the left side Y2 and the tilt locking mechanism 87 on the right side Y1.

Each of the steering systems 1 and 1P is not limited to a steering system of a manual type in which no assistance is provided to a driver when he or she turns the steering member 11, but may be an electric power steering system of a column assist type in which an electric motor provides assistance to a driver when he or she turns the steering member 11. Each of the steering systems 1 and 1P does not necessarily have to include the telescopic locking mechanism 83 but may alternatively include a telescopic locking mechanism having a different structure. Unlike the first and second embodiments, each of the steering systems 1 and 1P may include no telescopic locking mechanism 83.

Each of the steering systems 1 and 1P may have no telescopic adjusting function. In other words, each of the steering systems 1 and 1P may have only the tilt adjusting function. The lower jacket 23 is required to hold the upper jacket 22 by being sandwiched between the pair of lateral plates 30 so as to be reduced in diameter. In one example, the slit 33 may have a closed end on the front side X2. Each of the steering systems 1 and 1P may be configured so that the lower jacket 23 is replaced by a component that holds the upper jacket 22 without being reduced in diameter.

The tilt locking mechanism 86 and the tilt locking mechanism 87 may also be used in a steering system of a capsule type in which the steering system includes a capsule (not illustrated) connecting the attachment plate 29 (see FIG. 2) of the upper bracket 6 and the vehicle body 2 (see FIG. 1) to each other unlike the first and second embodiments. At the time of a secondary collision, the capsule (not illustrated) breaks, so that the upper bracket 6 is disconnected from the vehicle body 2.

Each of the steering system 1 according to the first embodiment and the steering system 1P according to the second embodiment is of an "upper lever type" in which the base end 41A of the operating member 41 is disposed on the upper side Z1 relative to the upper jacket 22. The tilt locking mechanism 86 and the tilt locking mechanism 87 may also be used in a steering system of a "lower lever type" in which the base end 41A of the operating member 41 is disposed on the lower side Z2 relative to the upper jacket 22.

What is claimed is:

1. A steering system comprising:
a steering shaft coupled at its one end to a steering member;
a column jacket holding the steering shaft;
a bracket supporting the column jacket such that the column jacket is rotatable in a tilt direction, the bracket being secured to a vehicle body;
a movable member including a first tooth arrangement, the movable member being movable together with the column jacket in the tilt direction and being movable in an intersecting direction intersecting the tilt direction and an axial direction of the steering shaft; and
a tooth member supported by the bracket so that the tooth member is located between the movable member and the bracket in the intersecting direction, the tooth member integrally including, as a single piece:
a second tooth arrangement engageable with the first tooth arrangement, and
a curved elastic portion supporting the second tooth arrangement, with the second tooth arrangement inclined toward the bracket such that the second tooth arrangement is away from the first tooth arrangement, wherein
the tooth member is configured so that the second tooth arrangement is in engagement with the first tooth arrangement, with the elastic portion being sandwiched between the movable member and the bracket and elastically deformed.

2. The steering system according to claim 1, wherein the elastic portion is curved to have a convex shape facing the movable member.

3. A steering system comprising:
a steering shaft coupled at its one end to a steering member;
a column jacket holding the steering shaft;
a bracket supporting the column jacket such that the column jacket is rotatable in a tilt direction, the bracket including a first tooth arrangement, the bracket being secured to a vehicle body;
a movable member movable together with the column jacket in the tilt direction and movable in an intersecting direction intersecting the tilt direction and an axial direction of the steering shaft; and
a tooth member located between the movable member and the bracket in the intersecting direction, the tooth member being movable together with the column jacket in the tilt direction, the tooth member integrally including, as a single piece:
- a second tooth arrangement engageable with the first tooth arrangement, and
- a curved elastic portion supporting the second tooth arrangement, with the second tooth arrangement inclined toward the movable member such that the second tooth arrangement is away from the first tooth arrangement, wherein the tooth member is configured so that the second tooth arrangement is in engagement with the first tooth arrangement, with the elastic portion being sandwiched between the movable member and the bracket and elastically deformed.

4. The steering system according to claim 3, wherein the elastic portion is curved to have a convex shape facing the bracket.

5. The steering system according to claim 1, wherein with the first tooth arrangement and the second tooth arrangement in engagement with each other, tooth traces of the first tooth arrangement and the second tooth arrangement extend in the intersecting direction.

6. The steering system according to claim 2, wherein with the first tooth arrangement and the second tooth arrangement in engagement with each other, tooth traces of the first tooth arrangement and the second tooth arrangement extend in the intersecting direction.

7. The steering system according to claim 3, wherein with the first tooth arrangement and the second tooth arrangement in engagement with each other, tooth traces of the first tooth arrangement and the second tooth arrangement extend in the intersecting direction.

8. The steering system according to claim 4, wherein with the first tooth arrangement and the second tooth arrangement in engagement with each other, tooth traces of the first tooth arrangement and the second tooth arrangement extend in the intersecting direction.

* * * * *